July 10, 1923.
G. G. WORSTALL
CULTIVATOR
Filed April 21, 1919
1,461,508
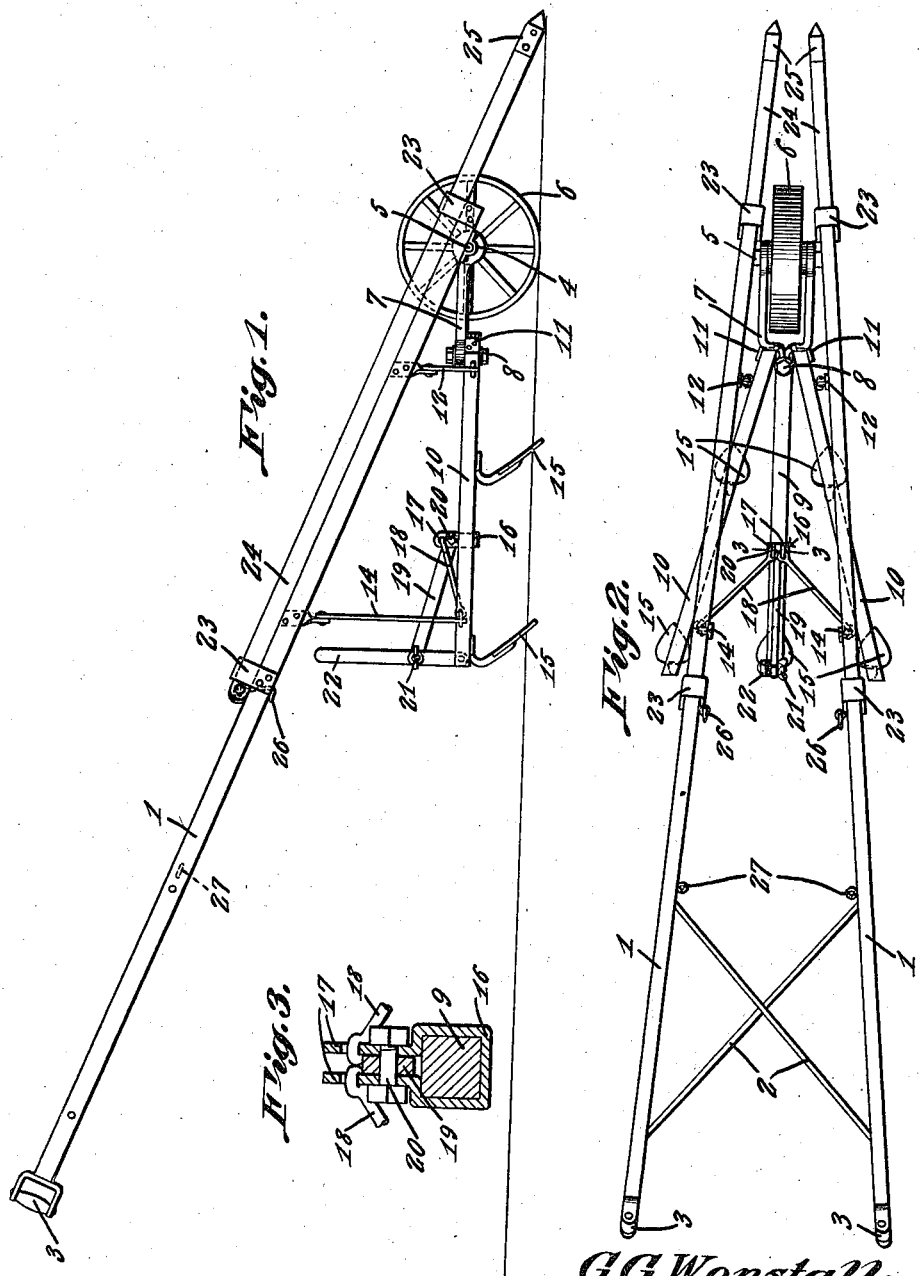
G.G. Worstall, Inventor
By C.A. Snow & Co.
Attorneys Patented July 10, 1923.

1,461,508

UNITED STATES PATENT OFFICE.

GEORGE G. WORSTALL, OF TOMS RIVER, NEW JERSEY.

CULTIVATOR.

Application filed April 21, 1919. Serial No. 291,614.

*To all whom it may concern:*

Be it known that I, GEORGE G. WORSTALL, a citizen of the United States, residing at Toms River, in the county of Ocean and State of New Jersey, have invented certain new and useful Improvements in Cultivators, of which the following is a specification.

It is the object of this invention to provide a simple means adapted to be mounted on the handle bars of a cultivator, for turning aside the foliage of plants so that the foliage will not be injured when the cultivator passes along the row.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a cultivator whereon the device forming the subject matter of this application has been mounted; Figure 2 is a top plan of the structure shown in Figure 1; and Figure 3 is a fragmental cross section taken on the line 3—3 of Figure 2.

In the drawings there is disclosed a wheel-mounted frame comprising bars 1 which slant downwardly, the bars being connected adjacent to their upper ends by braces 2. The rear ends of the bars 1 are supplied with handles 3, there being bearings 4 on the forward ends of the bars. In the bearings, an axle 5 is mounted, a ground wheel 6 being carried by the axle.

The cultivator may be constructed as occasion may demand but, in the present instance, the cultivator includes a yoke 7 connected at its forward end to the axle 5. A center beam 9 is connected at 8 to the rear end of the yoke 7. Side beams 10 are provided, the same being connected at their forward ends, as indicated at 11, to the forward end of the center beam 9, so that the side beams may be swung toward and away from the center beam, thereby to vary the width of the strip swept by the cultivator. The forward ends of the side beams 10 are connected with the bars 1 by pivoted links 12, links 14 connecting the rear ends of the side beams with the bars. The beams 9 and 10 carry shovel points 15 or other suitable soil engaging elements.

A rider 16 is mounted for reciprocation on the center beam 9 and has upstanding ears 17 to which links 18 are pivoted at their inner ends, the outer ends of the links being pivoted to the side beams 10 adjacent to the rear ends of the side beams. The forward end of an adjusting strip 19 is mounted on the pivot element 20 carried by the ears 17 of the rider 16. The rear end of the adjusting strip 19 is connected by a clamp screw 21 to the intermediate portion of an upstanding lever 22 fulcrumed at its lower end on the rear end of the center beam 9. The lever 22 may be swung forwardly or backwardly, the strip 19 imparting sliding movement to the rider 16, the links 18 swinging the side beams 10 inwardly or outwardly, thereby to vary the width of the zone swept by the cultivator.

U-shaped guides 23 are mounted on the bars 1 at the lower ends of the bars and at points substantially midway between the ends of the bars. Deflector rods 24 are mounted to slide on the upper edges of the bars 1 and are received within the guides 23, the deflector rods 24 being supplied at their lower ends with pointed shoes 25, adapted to ride over the surface of the ground. Hooks 26 are mounted on the rear ends of the deflector rods 24 and are adapted to cooperate with eyes 27 carried by the bars 1.

When the machine is arranged as shown in Figure 1, and is pushed forwardly, the shoes 25 ride along the surface of the ground, the rearwardly diverging deflector rods 24 serving to carry the foliage of the plants laterally, and to prevent the plants from being injured by the cultivator. When an obstruction of any kind is encountered, the deflector rods 24 will slide rearwardly and permit the device to pass by the obstruction. After the obstruction has been passed, the deflector rods 24 will slide downwardly along the inclined bars 1 until the shoes 25 cooperate again with the surface of the soil, as shown in Figure 1 of the drawings.

Having thus described the invention, what is claimed is:—

In a device of the class described, a cultivator comprising a frame and a ground wheel carried by the forward end of the frame; deflector rods mounted for free straight-line reciprocation on the frame, the rods converging in advance of the wheel, and being disposed at a pronouncedly acute angle to the horizontal whereby the rods may reciprocate freely as their forward ends ride along the soil.

In testimony whereof I affix my signature in the presence of two witnesses.

GEORGE G. WORSTALL.

Witnesses:
WALTER N. WRIGHT,
SARAH J. WRIGHT.